(12) United States Patent  
Takada et al.

(10) Patent No.: US 6,882,131 B1
(45) Date of Patent: Apr. 19, 2005

(54) POWER SUPPLY APPARATUS

(75) Inventors: Masahiro Takada, Hirakata (JP); Katsumi Kozu, Sanda (JP); Toshihiko Ichinose, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/754,960

(22) Filed: Jan. 9, 2004

(30) Foreign Application Priority Data

Oct. 6, 2003 (JP) ........................................ 2003-347923

(51) Int. Cl.$^7$ ................................................ G05F 1/40
(52) U.S. Cl. ...................................................... 323/282
(58) Field of Search ................................ 323/282, 283, 323/284, 285, 351

(56) References Cited

U.S. PATENT DOCUMENTS

| | | | | |
|---|---|---|---|---|
| 5,572,112 A | * | 11/1996 | Saeki et al. | 323/282 |
| 5,747,976 A | * | 5/1998 | Wong et al. | 323/282 |
| 6,456,051 B1 | * | 9/2002 | Darzy | 323/284 |
| 6,590,370 B1 | | 7/2003 | Leach | 323/299 |
| 6,621,257 B1 | * | 9/2003 | Mitamura et al. | 323/282 |
| 6,784,648 B1 | * | 8/2004 | Mitamura et al. | 323/282 |
| 6,813,173 B1 | * | 11/2004 | Lipcsei | 363/98 |

FOREIGN PATENT DOCUMENTS

| | | |
|---|---|---|
| JP | 7-336910 | 12/1995 |
| JP | 2000-173636 | 6/2000 |

* cited by examiner

*Primary Examiner*—Adolf Berhane
(74) *Attorney, Agent, or Firm*—Sheridan Ross PC

(57) ABSTRACT

A power supply apparatus comprises a power generating device in which the output power supplied to a load varies depending on a power generating condition; a current detection part for detecting the current output from the power generating device; a target output voltage setting part for setting a target output voltage of the power generating device; an error amplifier for amplifying the error between the voltage output from the power generating device and the target output voltage and outputting an error signal; a current control part for receiving input of the error signal, controlling the output current of the generating device so as to make the absolute value of the error signal small and outputting it to external output terminals; and an operation part for calculating the target output voltage as a desired operating condition of the power generating device by a predetermined function having at least the current detected by the current detecting part as an input parameter, and issuing it to the target output voltage setting part.

12 Claims, 6 Drawing Sheets

(a)

(b)

(a)

(b)

POWER SUPPLY APPARATUS

BACKGROUND OF THE INVENTION

The present invention relates to a power supply apparatus.

The output power of a fuel cell varies mainly depending on the variation in fuel feeding rate. The output power of a solar cell varies mainly depending on the variation in amount of solar radiation. Conventionally, in such a power supply apparatus having a power generating device (cell), the output power of which supplied to a load varies according to the power generating condition, DC output power of the power generating device has been converted into a power of a constant voltage or a constant current by using a DC-DC converter or a DC-AC converter to output it.

A prior art fuel cell apparatus is disclosed in Japanese Patent Laid-Open Publication No. 2000173636. In the prior art fuel cell apparatus, the DC power generated in the fuel cell main body itself is converted into a DC power of a specified voltage by using a DC-DC converter and the converted DC power is constantly supplied to output terminals connected to an external load.

A prior art electric power storage apparatus for a solar cell is disclosed in Japanese Patent Laid-Open Publication No. 7-336910. In the prior art electric power storage apparatus for a solar cell, a generated voltage of the solar cell is transformed and the output power is stored in a storage battery. A transformation means is controlled so as to maximize a charging current of the storage battery (output current of the transformation means).

The fuel cell has a characteristic that the response of the variation in the output power depending on the variation in the fuel feeding rate is slow. In the prior art fuel cell, it is necessary to constantly supply the fuel exceeding considerably the amount required to the fuel cell so as respond quickly to the event of rapid increase in load. This decreases the usage efficiency of the fuel cell. Further, in the case of a fuel cell that uses methanol as fuel, a considerable amount of unused-methanol is discharged. This raises the problem on the purification method of the discharged methanol. In the prior art fuel cell, the operation of constantly controlling the discharge rate of methanol below a predetermined value cannot be performed.

On the other hand, in the case of using the prior art electric power storage apparatus for a solar cell by connecting to an external load, due to change in temperature of a solar cell panel or load side power, the apparatus can be used under the condition outside the maximum efficiency of the solar cell.

Conventionally, in the power generating device in which the output power supplied to the load varies depending on the power generating condition, it has been a problem in this field to provide a power supply apparatus that is constantly operable under a desired operating condition (for example, an operating condition under which amount of the fuel discharged from the fuel cell becomes minimum or the output power of the solar cell becomes maximum).

The present invention is to solve the above-mentioned conventional problem, and in a power supply apparatus having a power generating device in which the output power supplied to the load varies depending on the power generating condition, and it intends to provide a multi-purpose power supply apparatus that is constantly operable under a desired operating condition even if the power generating condition changes.

BRIEF SUMMARY OF THE INVENTION

To solve the above-mentioned problems, the power supply apparatus of the present invention has the following configuration. The power supply apparatus from one point of view of the present invention comprises a power generating device in which the output power supplied to a load varies depending on a power generating condition; a current detection part for detecting the current outputted from the above-mentioned power generating device; a target output voltage setting part for setting a target output voltage of the above-mentioned power generating device; an error amplifier for amplifying the error between the voltage outputted from the above-mentioned power generating device and the above-mentioned target output voltage and outputting an error signal; a current control part for receiving input of the above-mentioned error signal, controlling the output current of the above-mentioned generating device so as to make the absolute value of the above-mentioned error signal small and outputting it to external output terminals; and an operation part for calculating the above mentioned target output voltage as a desired operating condition of the above-mentioned power generating device by a predetermined function having at least the current detected by the above-mentioned current detecting part as an input parameter, and issuing it to the above-mentioned target output voltage setting part.

In the power supply apparatus of the present invention, an intersecting point between the output current-output voltage characteristics of the power generating device and a predetermined function of the operation part (a voltage setting function having at least current as its input parameter) becomes the operating point of the power, generating device, even if the operating condition of the power generating device varies, its operating point can be automatically tracked constantly onto an optimum operating point.

The power supply apparatus from another point of view of the present invention comprises a power generating device in which the output power supplied to a load varies depending on a power generating condition; a voltage detection part for detecting the voltage outputted from the above-mentioned power generating device; a target output current setting part for setting a target output current of the above-mentioned power generating device; an error amplifier for amplifying the error between the current outputted from the above-mentioned power generating device and the above-mentioned target output current and outputting an error signal; a current control part for receiving input of the above-mentioned error signal, controlling the output current of the above-mentioned generating device so as to make the absolute value of the above-mentioned error signal small and outputting it to external output terminals; and an operation part for calculating the above-mentioned target output voltage as a desired operating condition of the above-mentioned power generating device by a predetermined function having at least the voltage detected by the above-mentioned voltage detecting part as an input parameter, and issuing it to the above-mentioned target output current setting part.

In the power supply apparatus of the present invention, an intersecting point between the output current-output voltage characteristics of the power generating device and a predetermined function of the operation part (a current setting function having at least voltage as its input parameter) becomes the operating point of the power generating device, even if the operating condition of the power generating device varies, its operating point can be automatically tracked constantly onto an optimum operating point.

In the power supply apparatus from another point of view of the present invention, the above-mentioned power generating device is a fuel cell and the above-mentioned desired operating condition is an operating condition under which the amount of fuel discharged from the above-mentioned fuel cell becomes minimum, an operating condition under which the output power of the above-mentioned fuel cell becomes maximum, or an operating condition under which the above-mentioned both of two conditions are made to be balanced.

In the power supply apparatus of the present invention, an intersecting point between the output current-output voltage characteristics of the fuel cell and a predetermined function of the operation part (a voltage setting function having at least current as its input parameter, or a current setting function having at least voltage as its input parameter) becomes the operating point of the fuel cell, even if the operating condition of the fuel cell including variation in fuel cell temperature and fuel feeding rate varies, its operating point can be automatically tracked constantly onto an optimum operating point (the point at which the amount of fuel discharged from the fuel cell becomes minimum, the output power of the fuel cell becomes maximum or the above-mentioned both of two conditions are made to be balanced).

In the power supply apparatus from another point of view of the present invention, the above-mentioned power generating device is a solar cell and the above-mentioned desired operating condition is an operating condition under which the output power of the above-mentioned solar cell becomes maximum.

In the power supply apparatus of the present invention, an intersecting point between the output current-output voltage characteristics of the solar cell and a predetermined function of the operation part (a voltage setting function having at least current as its input parameter, or a current setting function having at least voltage as its input parameter) becomes the operating point of the solar cell, even if the operating condition of the power generating device including variation in light receiving intensity and temperature of the solar cell varies, its operating point can be automatically tracked constantly onto an optimum operating point at which the output power becomes maximum.

In the power supply apparatus from another point of view of the present invention, the above-mentioned desired operating condition is a constant power operating condition under which the output power supplied to a load is a constant power, the above-mentioned constant power value is an amount required from the load.

In the power supply apparatus of the present invention, an intersecting point between the output current-output voltage characteristics of the power generating device and a constant output power function (setting voltage=power requested from load)/current or setting current=power requested from load/voltage) becomes the operating point of the power generating device, even if the operating condition of the power generating device varies, its operating point can be automatically tracked constantly onto an optimum operating point at which the power equal to the requested power is output.

In the power supply apparatus from another point of view of the present invention, the above-mentioned power generating device is a solar cell and the above-mentioned desired operating condition is an operating condition under which the output power of the above-mentioned solar cell becomes maximum.

In the power supply apparatus of the present invention, an intersecting point between the output current-output voltage characteristics of the solar cell and a predetermined function of the operation part (a voltage setting function having at least current as its input parameter, or a current setting function having at least voltage as its input parameter) becomes the operating point of the solar cell, even if the operating condition of the power generating device including variation in light receiving intensity and temperature of the solar cell varies, its operating point can be automatically tracked constantly onto an optimum operating point at which the output power becomes maximum.

In the power supply apparatus from another point of view of the present invention, the above-mentioned predetermined function is a function obtained by measuring the above-mentioned operating condition at a plural measuring points in advance and interpolating the above-mentioned measuring points.

The "predetermined function" can be easily obtained by measuring the output voltage and the output current at plural measuring points in a range under which the characteristic of its power generating device changes monotonically and acquiring an optimum operating point. The power supply apparatus of the present invention can calculate the operating point by using the predetermined function and can automatically track its operating point constantly onto its desired operating point, even if the operating condition of the generating device varies.

In the case that the power generating device is a fuel cell, experiments to generate power by the fuel cell at plural different fuel feeding rates in advance is performed, and at each experiment, output current and output voltage at the optimum operating point fulfilling the desired operating condition are measured. The "predetermined function" is a voltage setting function having the measured current its parameter, or a current setting function having the measured voltage as its parameter, which are obtained by interpolating the measured plural number of optimum operating points.

In the case that the power generating device is a solar cell, experiments to generate power by the solar cell at plural different amounts of light received in advance are performed, and at each experiment, output current and output voltage at the optimum-operating point fulfilling the desired operating condition are measured. The "predetermined function" is a voltage setting function having the measured current its parameter, or a current setting function having the measured voltage as its parameter, which are obtained by interpolating the measured plural number of optimum operating points.

The operation part calculates the target output voltage or the target output current by using the voltage setting function having the measured current as its parameter, the current setting function having the measured voltage as its parameter, or several measured data. Therefore, the operation part necessitates only a smaller-sized memory in comparison with the case of memorizing a data table of optimum operating points for every operating condition. The present invention has an effect of realizing more inexpensive power supply apparatus.

The novel features of the invention are set forth with particularity in the appended claims. The invention as to both structure and content, and other objects and features thereof will best be understood from the detailed description when considered in connection with the accompanying drawings.

Part or All of the drawings are drawn schematically for diagrammatic representation and it should be considered that they do not necessarily reflect relative size and position of components shown therein.

DETAILED DESCRIPTION OF THE INVENTION

Embodiments that specifically show the best mode for conducting the present invention will be described below with reference to figures.

<<First Embodiment>>

Figure 1:
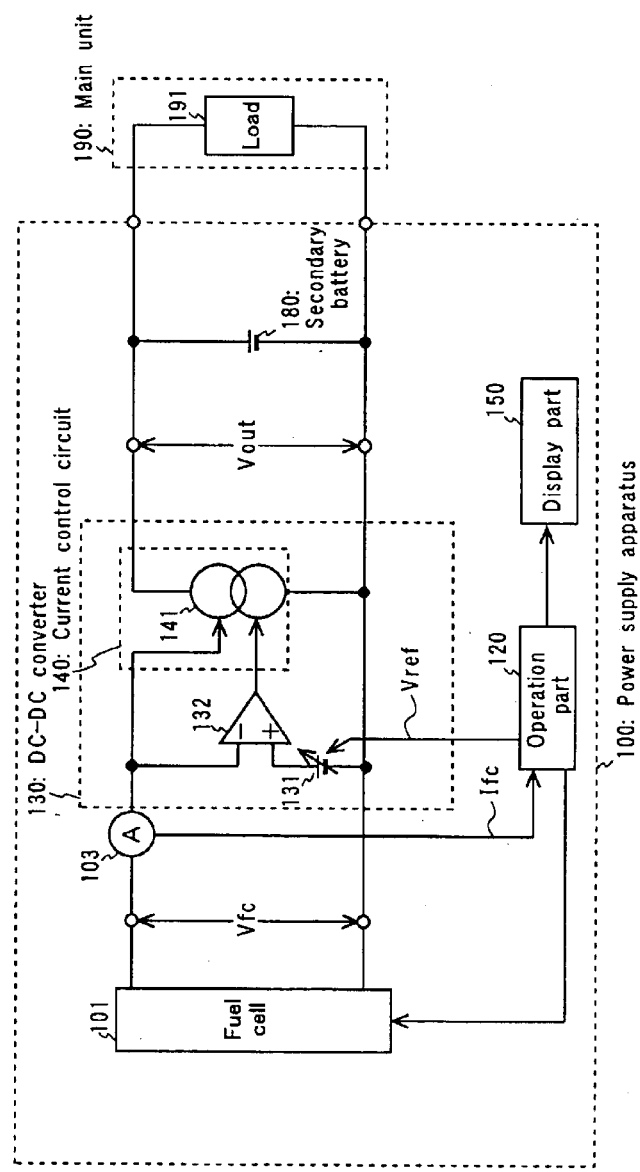
FIG. 1 is a block diagram showing the configuration of a power supply apparatus in accordance with a first embodiment of the present invention.
Figure 2:
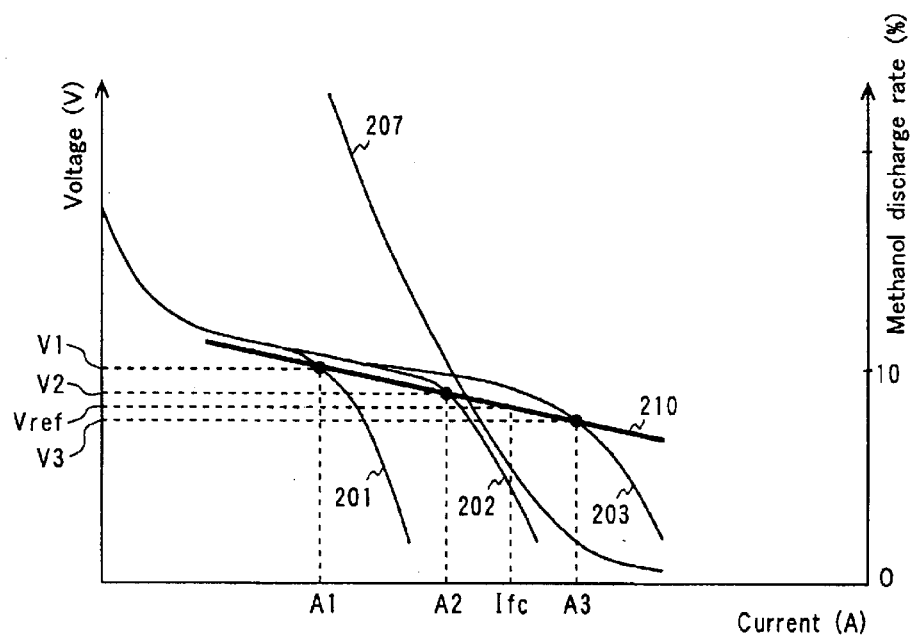
FIG. 2(a) is a graph showing an output current-output voltage characteristic having a fuel feeding rate as their parameter and an output current-methanol discharge rate characteristic of a balance-type fuel cell of the power supply apparatus in accordance with the first embodiment of the present invention.
FIG. 2(b) is a graph showing an output voltage-output power characteristic having a fuel feeding rate of the balance-type fuel cell of the power supply apparatus in accordance with the first embodiment of the present invention as its parameter.
Figure 2:
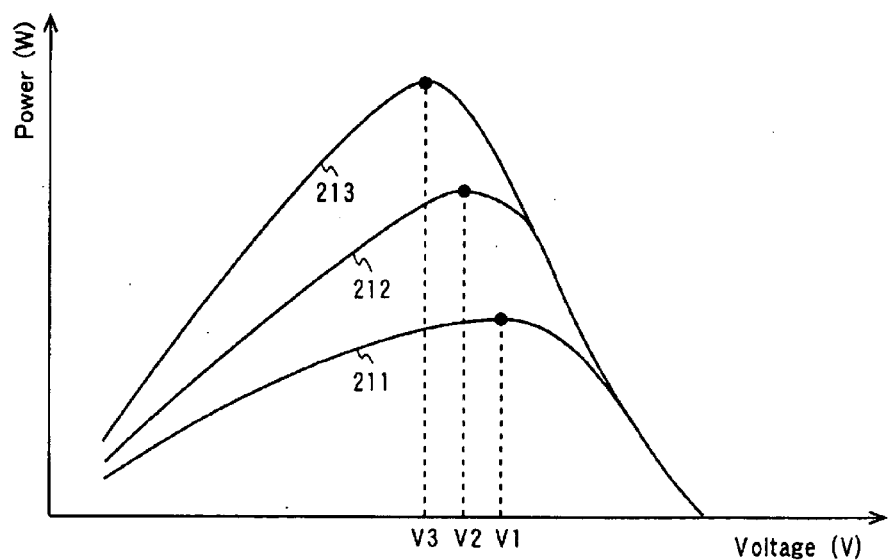
Figure 3:
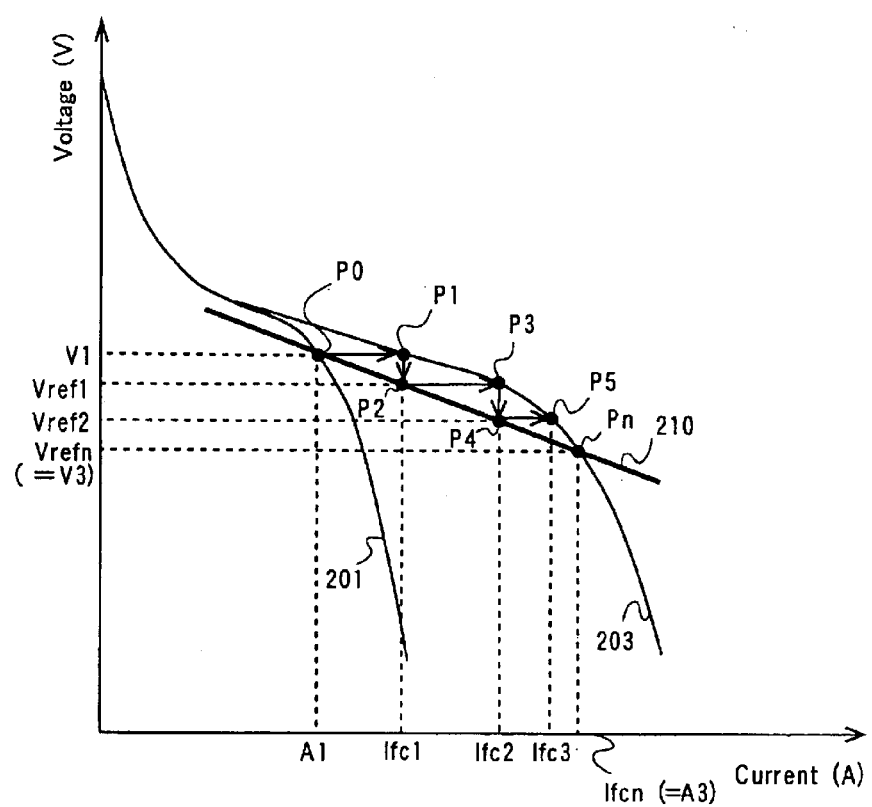
FIG. 3 is a graph for explaining the operation of the power supply apparatus in accordance with the first embodiment.

Referring to FIGS. 1, 2 and 3, a power supply apparatus in accordance with a first embodiment of the present invention will be described. FIG. 1 shows a power supply apparatus 100, a secondary battery 180 and a main unit 190. The power supply apparatus 100 has a fuel cell 101, a current detection part 103, an operation part 120, a DC-DC converter 130 and a display part 150. The main unit 190 has a load 191.

The main unit 190 is a personal computer. The secondary battery 180 is a lithium ion secondary battery. The fuel cell 101 is a balance-type fuel cell using methanol as its material (non-circulation type, a fuel cell of a type that keeps a balance between the amount of used fuel and the amount of output power). The fuel cell 101 receives a constant amount of fuel per unit of time and operates at an operating point at which the output power becomes maximum (output voltage and output current determined uniquely by the fuel feeding rate). In other words, the power supply apparatus 100 in accordance with the first embodiment operates at a desired condition under which the output power of the fuel cell 101 becomes maximum.

The DC-DC converter 130 has a setting voltage (target input voltage) 131, an error amplifier 132 and a current control part 140. The current control part 140 has a constant current source 141.

The DC-DC converter 130 controls the output current of the fuel cell 101 (input current of the DC-DC converter 130) so as to match the output voltage of the fuel cell 101 (input voltage of the DC-DC converter 130) with the target input voltage as cross as possible. That is, the fuel cell 101 outputs a predetermined output power (=the output current of the fuel cell 101×the output voltage corresponding to the output current) and the DC-DC converter 130 converts the output power of the fuel cell 101 and feed the converted power to the load 191 and/or the secondary battery 180. Output terminals of the DC-DC converter 130 are connected to output terminals of the secondary battery 180, and the output voltage of the DC-DC converter 130 agrees with the output voltage (or charging voltage) of the secondary battery 180 (For example, when the output voltage of the secondary battery 180 is 8V, the output voltage of the DC-DC converter 130 becomes 8V).

The setting voltage 131 functions as a target output voltage setting part for setting the target output voltage of the fuel cell 101 (that is, the target input voltage of the DC-DC converter 130). Specifically, the error amplifier 132 compares the setting voltage (the target input voltage) 131 with the input voltage of the DC-DC converter 130 (that is, the output voltage Vfc of the fuel cell 101) and outputs a control signal (an error signal) corresponding its error component. Based on the error signal, the current control part 140 controls the output current so that the output voltage of the fuel cell 101 becomes as close as possible to the setting voltage (target input voltage) 131 (an absolute value of the error signal becomes as small as possible). In FIG. 1, as the level of the error signal drops, the current control part 140 increases the output current.

The output voltage of the DC-DC converter 130 (which equals to the output voltage of the secondary battery 180) is defined as Vout. In the first embodiment, the output current of the DC-DC converter 130 is represented by the following equation.

(Output current of the DC-DC converter 130)=(Power conversion efficiency η)×(Output current of the fuel cell 101)×(Output voltage of the fuel cell 101)/(Output voltage of the secondary battery 180)

The power supply apparatus 100 feeds the power output from the fuel cell 101 to the main unit 190, and in the case that the power output from the DC-DC converter 130 becomes redundant even after the power has been fed to the main unit 190, the secondary battery 180 is charged by the redundant power. On the contrary, in the case that the power output from the fuel cell 101 is not enough to be fed to the main unit 190, the secondary battery 180 discharges the deficient power. The power supply apparatus 100 feeds the power output from the fuel cell 101 as well as the power discharged from the secondary battery 180 to the main unit 190. The secondary battery 180 absorbs a rapid change in the power fed to the load 191.

The current detection part 103 detects the output current Ifc of the fuel cell 101 (the input current of the DC-DC converter 130) and sends a voltage signal corresponding to its current value to the operation part 120. Based on the output current Ifc of the fuel cell 101 (or the output current Ifc and the fuel feeding rate), the operation part 120 calculates the output voltage Vref of the fuel cell 101 so as to maximize the output power of the fuel cell 101 and set the output voltage Vref as a new setting voltage (target input voltage) 131.

The display part 150 displays an operating condition of the fuel cell 101.

Referring to FIGS. 2 and 3, a method for setting the setting voltage 131 will be described in detail. FIG. 2(a) is a graph showing an output current-output voltage characteristic having a fuel feeding rate as their parameter and an output current-methanol discharge rate characteristic of a balance-type fuel cell of the power supply apparatus in accordance with the first embodiment of the present invention. FIG. 2(b) is a graph showing an output voltage output current characteristic having a fuel feeding rate of the balance-type fuel cell of the power supply apparatus in accordance with the first embodiment of the present invention as its parameter. In FIG. 2(a), a horizontal axis and a vertical axis represent the output current (A), and the output voltage (V) or methanol discharge rate (%), respectively. Reference numerals 201, 202 and 203 indicate the output current-output voltage characteristics in the case of 0.1 cc/min, 0.2 cc/min and 0.3 cc/min of fuel feeding rate, respectively. Reference numeral 207 indicates the output current-methanol discharge rate characteristic of the fuel cell 101 in the case of 0.3 cc/min of fuel feeding rate. In FIG. 2(b), a horizontal axis and a vertical axis represent the output voltage (V) and the output power (W), respectively. Reference numerals 211, 212 and 213 indicate the output voltage-output power characteristics in the case of 0.1 cc/min, 0.2 cc/min and 0.3 cc/min of fuel feeding rate, respectively. The output current-output voltage characteristic and the output voltage-output power characteristic of the fuel cell 101 vary depending on the fuel feeding rate of the fuel cell 101. Once the fuel feeding rate is determined to be a specific value, the output current-output voltage characteristic and the output voltage-output power characteristic at the fuel feeding rate are determined uniquely.

The case of 0.3 cc/min of fuel feeding rate will be described below. For the output current output voltage characteristic 203, when the output current falls in the range of 0 to A3, as the output current increases, the output voltage decreases to some extent, but it remains substantially stable. When the output current is A3, the output voltage is V3. When the output current exceeds A3, the decrease rate of the output voltage increases with increasing output current.

For the output voltage-output power characteristic 213, when the output voltage falls in the range of 0 to V3, as the output voltage increases, the output power also increases. When the output voltage is V3, the output power becomes maximum. When the output voltage exceeds V3, the output power decreases with increasing output voltage.

For the methanol discharge rate 207, when the output current of the fuel cell 101 falls in the range of 0 to A3, the methanol discharge rate decreases as the output current increases. At the point when the output current becomes A3, the amount of methanol discharged becomes minute. When the output current exceeds A3, the amount of methanol discharged decreases slightly. That is, when the output current of the fuel cell 101 falls in the range of 0 to A3, the fuel cell 101 cannot use up the supplied methanol, resulting in discharging the redundant methanol. When the output current is A3 or more, the fuel cell 101 almost uses up the supplied methanol and then discharges only a small amount of methanol.

In the case of 0.3 cc/min of fuel feeding rate, the output voltage and the output current at an operating point at which a desired operating condition is satisfied under which the output power of the fuel cell 101 becomes maximum (hereinafter referred to as an "optimal operating point") are V3 and A3, respectively.

The case of 0.1 cc/min or 0.2 cc/min of fuel feeding rate is similar to the case of 0.3 cc/min. In the case of 0.1 cc/min of fuel feeding rate, the output voltage and the output current at the operating point at which the output power of the fuel cell 101 becomes maximum are V1 and A1, respectively. In the case of 0.2 cc/min of fuel feeding rate, the output voltage and the output current at the operating point at which the output power of the fuel cell 101 becomes maximum are V2 and A2, respectively. The output voltages and the output currents (V1 and A1, V2 and A2, V3 and A3) at the respective optimum operating point of the fuel cell 101 for each fuel feeding rate are data measured previously in experiments. In the balance-type fuel cell, the optimum operating point for the fuel feeding rate within a predetermined extent appears on a voltage setting function 210 having the measured current in FIG. 2(a) as its parameter (hereinafter referred as to the "voltage setting function 210"). The voltage setting function 210 is a function obtained by performing linear interpolation between the experimental data. The operation part 120 stores gradient and intercept of the voltage setting function 210.

Referring to FIG. 3, the operation of the power supply apparatus 100 in accordance with the first embodiment configured as mentioned above will be described specifically. FIG. 3 is a graph for explaining the operation of the power supply apparatus in accordance with the first embodiment. Like FIG. 2(a), FIG. 3 shows an output current-output voltage characteristic having the fuel feeding rate of the balance-type fuel cell 101 of the power supply apparatus in accordance with the first embodiment as their parameter. Same reference numerals are assigned to the same curves in FIG. 3 as those in FIG. 2(a).

In the power supply apparatus 100, the fuel feeding rate to the fuel cell 101 is controlled so as to maintain 0.1 cc/min. In the case of the fuel feeding rate of 0.1 cc/min, the output voltage and the output current of the fuel cell 101 at the optimum operating point P0 are V1 and A1, respectively. The operation part 120 sets the voltage V1 as the setting voltage (target input voltage) 131.

The optimum operating point of the fuel cell 101 is uniquely determined depending on the fuel feeding rate. However, even if the fuel feeding rate from a fuel feeding pump (not shown) of the fuel cell 101 is constant, the amount of the fuel used actually for the fuel cell 101 to generate power varies due to various factors such as fuel cell temperature, variation in characteristic of a solid electrolyte, deterioration of the solid electrolyte with age, variation in characteristic of the fuel feeding pump. Accordingly, the output current-output voltage characteristic and the optimum operating point of the fuel cell 101 vary with time.

Assuming that the amount of the fuel used for the fuel cell 101 to generate power changes, thereby to change the output current-output voltage characteristic from the curve 201 to the curve 203. As the output voltage (setting voltage 131) of the fuel cell 101 is set at V1, the operating point of the fuel cell 101 becomes the operating point $P_1$ (current Ifc1, voltage V1) on the output voltage-output current 203. The operation part 120 calculates the optimum setting voltage 131 at the output current Ifc1 of the fuel cell 101 detected by the current detection part 103 from the voltage setting function 210 and sets the calculated voltage Vref1 as a new setting voltage 131 (operating point P2). As the output voltage of the fuel cell 101 is set at Vref1, the operating point of the fuel cell 101 becomes the operating point P3 (current Ifc2, voltage Vref2) on the output voltage-output current 203. The operation part 120 calculates the optimum setting voltage 131 at the output current Ifc2 of the fuel cell 101 detected by the current detection part 103 from the voltage setting function 210 and sets the calculated voltage Vref2 as a new setting voltage 131 (operating point P4). In this way, the operating point of the fuel cell 101 makes a transition from P0 to P1, P2, P3, P4 . . . and converges to an intersecting point Pn (current Ifcn, voltage Vrefn) of the output voltage-output current 203 and the voltage setting function 210). The operating point Pn is the optimum operating point at which the output power of the fuel cell 101 becomes maximum on the output voltage-output current 203 (The current Ifcn and the voltage Vrefn represent the values A3 and V3, respectively).

In the case that the operating point fails to converge to a single point, the operation part 120 orders the display part 150 to display an error message thereon. The display part 150 displays the error message thereon.

In the power supply apparatus 100 in accordance with the first embodiment, the optimum operating point of the fuel cell 101 is tracked according to variation in the power generating condition of the fuel cell 101 so that maximum power can be taken from the fuel cell 101 at all times. In other words, the power supply apparatus 100 in accordance with the first embodiment operates in the desired operating condition at all times.

The power supply apparatus 100 in accordance with the first embodiment operates in the desired operating condition under which the output power of the fuel cell 101 becomes maximum. Alternatively, the fuel cell 101 may be put into operation in the operating condition under which the methanol discharge rate becomes minimum (or minute). In FIGS. 2(a) and 2(b), in the case that the operating point is set on the right side of the point at which the output power of the fuel cell 101 becomes maximum, the output power of the fuel cell 101 fails to become maximum, but the fuel cell 101 discharges only a small amount of methanol. A function obtained by interpolating the operating points on the output current-output voltage characteristics 201, 202 and 203 at which only a small amount of methanol is discharged can be set to be a voltage setting function. This enables realizing a clean power supply apparatus with minimum methanol discharge rate.

The fuel cell 101 may be operated in the operating condition under which the methanol discharge rate becomes a predetermined value or less and maximum power can be taken therefrom. The fuel cell 101 may be also operated in the operating condition under which the output power of the DC-DC converter 130 becomes constant.

According to each "desired operating condition", the voltage setting function (not limited to a straight line) differs from the voltage setting function 210 in the first embodiment.

Preferably, the voltage setting function is a function obtained by operating the fuel cell 101 in the desired operating condition through experiment in advance and interpolating the several measured data.

The operation part 120 calculates the setting voltage 131 by using the voltage setting function or several measured data. Therefore, the operation part 120 necessitates only a smaller-sized memory in comparison with the case of memorizing a data table of optimum operating points for every fuel feeding rate, thereby to realize more inexpensive power supply apparatus 100.

That is, an intersecting point between the output current-output voltage characteristics of the fuel cell and a predetermined function of the operation part (a voltage setting function having current as its input parameter. The setting voltage function 210 in the first embodiment) becomes the operating point of the fuel cell, even if the operating condition of the fuel cell including variation in fuel cell temperature and fuel feeding rate varies, its operating point can be automatically tracked constantly onto an optimum operating point (the point at which the amount of fuel discharged from the fuel cell becomes minimum, the output power of the fuel cell becomes maximum or the above-mentioned both of two conditions are made to be balanced).

Alternatively, it is possible to use another power generating device, in place of the fuel cell 101 of the first embodiment 1, the output power of which varies depending on the power generating condition and the voltage setting function (not limited to a straight line) in the power generating device.

The following configuration instead of the configuration as in the first embodiment may be adopted. A voltage detection part detects the output voltage Vfc of the fuel cell 101. Based on the output voltage Vfc of the fuel cell 101 (or the fuel feeding rate and the output voltage Vfc), the operation part 120 calculates the output current Ifc of the fuel cell 101 so that the output power of the fuel cell 101 becomes maximum and sets the calculated output current as a new setting current (target input current) 131. The error amplifier 132 compares the setting current (target input current) 131 with the input current of the DC-DC converter 130 (that is, the output current Ifc of the fuel cell 101) and outputs a control signal (an error signal) corresponding to the error component. Based on the error signal, the current control part 140 controls the output current so that the output current of the fuel cell 101 becomes as close as possible to the setting current (target input current) 131 (an absolute value of the error signal becomes as small as possible).

<<Second Embodiment>>

Figure 4:
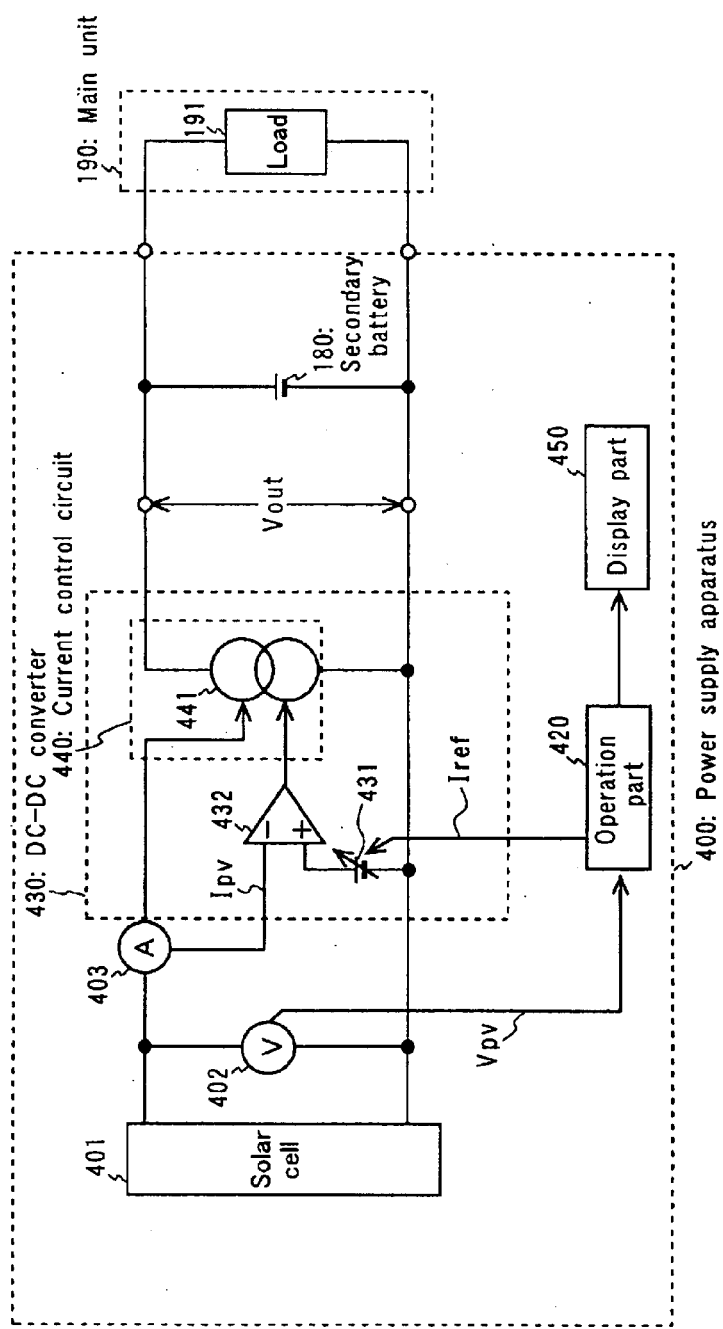
FIG. 4 is a block diagram showing the configuration of a power supply apparatus in accordance with a second embodiment of the present invention.
Figure 5:
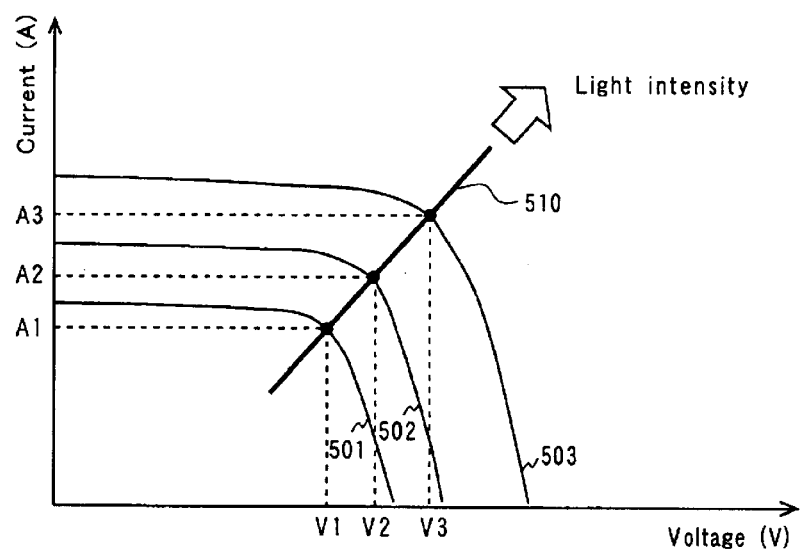
FIG. 5(a) is a graph showing an output voltage-output current characteristic having an amount of light received of a solar cell of the power supply apparatus in accordance with the second embodiment of the present invention as its parameter.
FIG. 5(b) is a graph showing an output voltage output power characteristic having an amount of light received of the solar cell of the power supply apparatus in accordance with the second embodiment of the present invention as its parameter.
Figure 5:
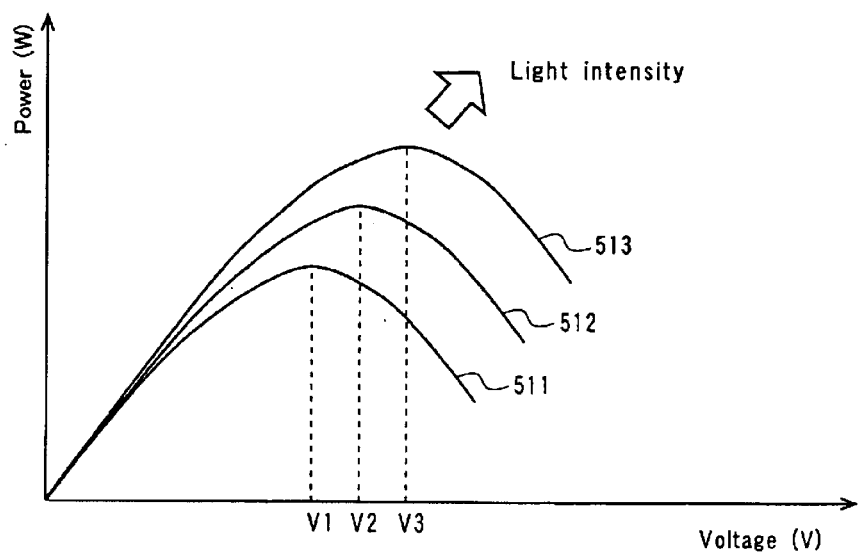
Figure 6:
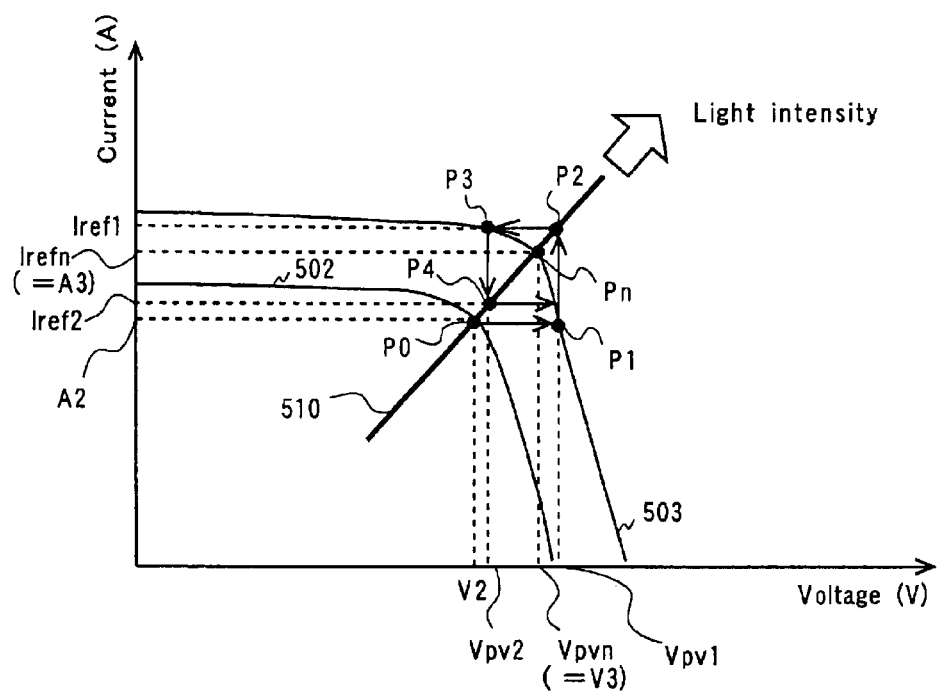
FIG. 6 is a graph for explaining the operation of the power supply apparatus in accordance with the second embodiment of the present invention.

Referring to FIGS. 4, 5 and 6, a power supply apparatus in accordance with a second embodiment of the present invention will be described below. FIG. 4 shows a power supply apparatus 400, a secondary battery 180 and a main unit 190. The power supply apparatus 400 has a solar cell 401, a voltage detection part 402, a current detection part 403, an operation part 420, a DC-DC converter 430 and a display part 450. The main unit has a load 191.

The main unit 190 is an automatic measuring device. The secondary cell 180 is a lead storage battery. The solar cell 401 converts light energy into electrical energy directly. The solar cell 401 operates at the operating point at which the output power becomes maximum (output voltage and output current uniquely determined by the amount of light received). That is, the power supply apparatus 400 in accordance with the second embodiment operates in the desired operating condition under which the output power of the solar cell 401 becomes maximum.

The DC-DC converter 430 has a setting voltage 431 (target input current Iref), an error amplifier 432 and a current control part 440. The current control part 440 has a constant current source 441.

The current detection part 403 detects the output current Ipv of the solar cell 401 and outputs a voltage signal corresponding the output current Ipv to the error amplifier 432. The DC-DC converter 430 controls the output current (the input current of the DC-DC converter 430) so as to match the output current Ipv of the solar cell 401 (input current of the DC-DC converter 430) with the target input current Iref as cross as possible. That is, the solar cell 401 outputs a predetermined output power (=the output voltage of the solar cell 401× the output current corresponding to the output voltage) and the DC-DC converter 430 converts the output power of the solar cell 401 and feed the converted power to the load 191 and/or the secondary battery 180. Output terminals of the DC-DC converter 430 are connected to output terminals of the secondary battery 180, and the output voltage of the DC-DC converter 430 agrees with the output voltage (or charging voltage) of the secondary battery 180 (For example, when the output voltage of the secondary battery 180 is 8V, the output voltage of the DC-DC converter 430 becomes 8V).

The voltage detection part 402 detects the output voltage Vpv of the solar cell 401 and sends it to the operation part 420. Based on the output voltage Vpv of the solar cell 401, the operation part 420 calculates the target input current Iref so as to maximize the output power of the solar cell 401 and changes the setting voltage (voltage corresponding the target input current) 431. The error amplifier 432 compares the setting voltage (target input current) 431 with the input current of the DC-DC converter 430 (that is, the output current Ipv of the solar cell 401) and outputs a control signal (an error signal) corresponding to the error component. Based on the error signal, the constant current source 441 controls the output current so that the output current of the solar cell 401 becomes as close as possible to the target output current (an absolute value of the error signal becomes as small as possible). The setting voltage 431 functions as a target output current setting part for setting the target output current of the solar cell 401 (that is, target input current of the DC-DC converter 430). The output voltage of the DC-DC converter 430 (which is equal to the output voltage of the secondary cell 180) is defined as Vout.

The power supply apparatus 400 feeds the power output from the solar cell 401 to the main unit 190, and in the case that the power output from the DC-DC converter 430 becomes redundant even after the power has been fed to the main unit 190, the secondary battery 180 is charged by the redundant power. On the contrary, in the case that the power output from the solar cell 401 is not enough to be fed to the main unit 190, the secondary battery 180 discharges the deficient power. The power supply apparatus 400 feeds the power output from the solar cell 401 as well as the power discharged from the secondary battery 180 to the main unit 190. The secondary battery 180 absorbs a rapid change in the power fed to the load 191.

The display part 450 displays the operation condition of the solar cell 401.

Referring to FIGS. 5 and 6, the method of setting the setting voltage (target input current) 431 will be described in detail. FIG. 5(a) is a graph showing an output voltage-output current characteristic having the amount of light received of the power supply apparatus in accordance with the second embodiment of the present invention as its parameter. FIG. 5(b) is a graph showing an output voltage-output power characteristic having the amount of light received of the power supply apparatus in accordance with the second embodiment of the present invention as its parameter. In FIG. 5(a), a horizontal axis and a vertical axis represent the output voltage (V) and the output current (A), respectively. Reference numerals 501, 502 and 503 indicate the output voltage-output current characteristics in the case a small, medium and large amount of light received, respectively. In FIG. 5(b), a horizontal axis and a vertical axis represent the output voltage (V) and the output power (W), respectively. Reference numerals 511, 512 and 513 indicate the output voltage-output power characteristics in the case a small, medium and large amount of light received, respectively. The output voltage-output current characteristic and the output voltage-output power characteristic of the solar cell 401 vary depending on the amount of light received by the solar cell 401. Once the amount of light received is determined to be a specific value, the output voltage-output current characteristic and the output voltage-output power characteristic are determined uniquely at the specific amount of light received.

In the solar cell 401, the output current and the output voltage increase with the increasing light intensity. In the case that the light intensity is constant; the output current remains substantially constant while the output voltage is small and starts to drop when the output voltage exceeds a predetermined value. For this reason, at a certain current and voltage, the output power as a product of the output voltage and the output current becomes maximum. For example, in the case of a "small" amount of light received, the output power becomes maximum at the output voltage V1 and the output current A1 (output voltage-output current characteristic 501, output voltage-output power characteristic 511). In the case of a "medium" amount of light received, the output power becomes maximum at the output voltage V2 and the output current A2 (output voltage output current characteristic 502, output voltage-output power characteristic 512). In the case of a "large" amount of light received, the output power becomes maximum at the output voltage V3 and the output current A3 (output voltage-output current characteristic 503, output voltage-output power characteristic 513). The operating point at which a desired operating condition is satisfied under which the output power of the solar cell 401 becomes maximum (hereinafter referred to as an "optimal operating point") is determined uniquely by the amount of light received.

The output voltages and the output currents (V1 and A1, V2 and A2, V3 and A3) at the optimum operating points of the solar cell 401 for each amount of light received are data measured previously through experiment. The optimum operating point of the solar cell 401 for a given amount of light received appears on a voltage setting function 510 having the measured current in FIG. 5(a) as its parameter (hereinafter referred as to "voltage setting function 510"). The voltage setting function 510 is a function obtained by performing linear interpolation between the experimental data. The operation part 520 stores gradient and intercept of the voltage setting function 510.

Referring to FIG. 6, the operation of the power supply apparatus 400 in accordance with the second embodiment configured as mentioned above will be described specifically. FIG. 6 is a graph for explaining the operation of the power supply apparatus in accordance with the second embodiment. Like FIG. 5(a), FIG. 6 shows an output current-output voltage characteristic having the amount of light received of the solar cell of the power supply apparatus in accordance with the second embodiment as their parameter. Same reference numerals are assigned to the same curves in FIG. 6 as those in FIG. 5(a).

An initial operating point of the power supply apparatus 400 is defined as P0 (output voltage V2, output current A2). The operating point P0 is an optimum operating point of the solar cell 401 in the case of a "medium" amount of light received. The target input current Iref is set as A2.

The output power of the solar cell 401 varies depending on factors including amount of light received and temperature. Assuming that the output voltage-output current characteristic changes from the curve 502 to the curve 503 according to the change in the amount of light received. As the output current (setting voltage 431) of the solar cell 401 is set at A2, the operating point of the solar cell 401 becomes the operating point P1 (voltage Vpv1, current A2) on the output voltage-output current 503. The operation part 420 calculates the optimum setting voltage 431 at the output voltage Vpv1 of the solar cell 401 detected by the voltage detection part 402 from the current setting function 510 and sets the calculated current Iref1 as a new target input current (operating point P2). As the output current of the solar cell 401 is set at Iref1, the operating point of the solar cell 401 becomes the operating point P3 (voltage Vpv2, current Iref1) on the output voltage output current 503. The operation part 420 calculates the optimum setting voltage (target input current) 431 at the output voltage Vpv2 of the solar cell 401 detected by the voltage detection part 402 from the current setting function 510 and sets the calculated current Iref2 as a new target input current (operating point P4). In this way, the operating point of the solar cell 401 makes a transition from P0 to P1, P2, P3, P4 . . . and converges to an intersecting point Pn (current Irefn, voltage Vpvn) of the output voltage output current 503 and the voltage setting function 510. The operating point Pn is the optimum operating point at which the output power of the solar cell 401 becomes maximum. (The current Irefn and the voltage Vpvn represent the values A3 and V3, respectively).

In the case that the operating point fails to converge to a single point, the operation part 420 orders the display part 450 to display an error message thereon. The display part 450 displays the error message thereon.

In the power supply apparatus 400 in accordance with the second embodiment, the optimum operating point of the solar cell 401 is tracked according to variation in the power generating condition of the solar cell 401 so that maximum power can be taken from the fuel cell 101 at all times. In other words, the power supply apparatus 400 in accordance with the second embodiment operates in the desired operating condition at all times.

That is, an intersecting point between the output current-output voltage characteristics of the solar cell and a predetermined function of the operation part (a voltage setting function having at least current as its input parameter, or a current setting function having at least voltage as its input parameter. The setting current function 510 in the second embodiment) becomes the operating point of the solar cell, even if the operating condition of the power generating device including variation in light receiving intensity and temperature of the solar cell varies, its operating point can be automatically tracked constantly onto an optimum operating point at which the output power becomes maximum.

In the second embodiment, the solar cell 401 operates in the operating condition under which the output power of the solar cell 401 becomes maximum. The solar cell 401 may be also operated in the operating condition under which the output power of the DC-DC converter 430 becomes constant.

According to each "desired operating condition", the current setting function (not limited to a straight line) differs from the current setting function 510 in the second embodiment.

Preferably, the current setting function is a function obtained by operating the solar cell 401 in the desired operating condition through experiment in advance and interpolating the several measured data.

The operation part 420 calculates the setting voltage 431 by using the current setting function or several measured data. Therefore, the operation part 420 necessitates only a smaller-sized memory in comparison with the case of memorizing a data table of optimum operating points for every amount of light received, thereby to realize more inexpensive power supply apparatus 400.

Alternatively, it is possible to use another power generating device, in place of the solar cell 401 of the second embodiment, output power of which varies depending on the power generating condition and the current setting function (not limited to a straight line) in the power generating device.

The following configuration instead of the configuration as in the second embodiment may be adopted. A voltage detection part detects the output voltage Vpv of the solar cell 401. Based on the output voltage Vpv, the operation part 420 calculates the output current Ipv of the solar cell 401 so that the output power of the solar cell 401 becomes maximum and sets the calculated output current as a new setting current (target input current) 431. The error amplifier 432 compares the setting current (target input current) 431 with the input current of the DC-DC converter 430 (that is, the output current Ipv of the solar cell 401) and outputs a control signal (an error signal) corresponding to the error component. Based on the error signal, the current control part 440 controls the output current so that the output current of the solar cell 401 becomes as close as possible to the setting current (target input current) 431 (an absolute value of the error signal becomes as small as possible).

In the first and second embodiments, the secondary battery 180 may be another secondary battery such as cadmium-nickel battery and nickel hydrogen battery or direct current power converted from commercial alternating current.

The present invention has an advantageous effect of realizing a general purpose power supply apparatus in which the power generating device output current of which varies depending on the power generating condition can be operated in the desired operating condition at all times.

In the power supply apparatus of the present invention, an intersecting point between the output current-output voltage characteristics of the power generating device and a predetermined function of the operation part (a voltage setting function having at least current as its input parameter, or a current setting function having at least voltage as its input parameter) becomes the operating point of the power generating device, even if the operating condition of the power generating device varies, its operating point can be automatically tracked constantly onto an optimum operating point.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A power supply apparatus comprising:

a power generating device in which the output power supplied to a load varies depending on a power generating condition;

a current detection part for detecting the current outputted from said power generating device;

a target output voltage setting part for setting a target output voltage of said power generating device;

an error amplifier for amplifying the error between the voltage outputted from said power generating device and said target output voltage and outputting an error signal;

a current control part for receiving input of said error signal, controlling the output current of said generating device so as to make the absolute value of said error signal small and outputting it to external output terminals; and an operation part for calculating said target output voltage as a desired operating condition of said power generating device by a predetermined function having at least the current detected by said current detecting part as an input parameter, and issuing it to said target output voltage setting part.

2. A power supply apparatus as stated in claim 1, wherein said power generating device is a fuel cell and said desired operating condition is an operating condition under which the amount of fuel discharged from said fuel cell becomes minimum, an operating condition under which the output power of said fuel cell becomes maximum, or an operating condition under which said both of two conditions are made to be balanced.

3. A power supply apparatus as stated in claim 1, wherein said power generating device is a solar cell and said desired operating condition is an operating condition under which the output power of said solar cell becomes maximum.

4. A power supply apparatus as stated in claim 1, wherein said desired operating condition is a constant power operating condition under which the output power supplied to a load is a constant power, said constant power value is an amount required from the load.

5. A power supply apparatus as stated in claim 2, wherein said predetermined function is a function obtained by measuring said operating condition at a plural measuring points in advance and interpolating said measuring points.

6. A power supply apparatus as stated in claim 3, wherein said predetermined function is a function obtained by measuring said operating condition at a plural measuring points in advance and interpolating said measuring points.

7. A power supply apparatus comprising:
   a power generating device in which the output power supplied to a load varies depending on a power generating condition;
   a voltage detection part for detecting the voltage outputted from said power generating device;
   a target output current setting part for setting a target output current of said power generating device;
   an error amplifier for amplifying the error between the current outputted from said power generating device and said target output current and outputting an error signal;
   a current control part for receiving input of said error signal, controlling the output current of said generating device so as to make the absolute value of said error signal small and outputting it to external output terminals; and
   an operation part for calculating said target output current as a desired operating condition of said power generating device by a predetermined function having at least the voltage detected by said voltage detecting part as an input parameter, and issuing it to said target output current setting part.

8. A power supply apparatus as stated in claim 7, wherein said power generating device is a fuel cell and said desired operating condition is an operating condition under which the amount of fuel discharged from said fuel cell becomes minimum, an operating condition under which the output power of said fuel cell becomes maximum, or an operating condition under which said both of two conditions are made to be balanced.

9. A power supply apparatus as stated in claim 7, wherein said power generating device is a solar cell and said desired operating condition is an operating condition under which the output power of said solar cell becomes maximum.

10. A power supply apparatus as stated in claim 7, wherein said desired operating condition is a constant power operating condition under which the output power supplied to a load is a constant power, said constant power value is an amount required from the load.

11. A power supply apparatus as stated in claim 8, wherein said predetermined function is a function obtained by measuring said operating condition at a plural measuring points in advance and interpolating said measuring points.

12. A power supply apparatus as stated in claim 9, wherein said predetermined function is a function obtained by measuring said operating condition at a plural measuring points in advance and interpolating said measuring points.

* * * * *

UNITED STATES PATENT AND TRADEMARK OFFICE
CERTIFICATE OF CORRECTION

PATENT NO. : 6,882,131 B1
DATED : April 19, 2005
INVENTOR(S) : Masahiro Takada

It is certified that error appears in the above-identified patent and that said Letters Patent is hereby corrected as shown below:

<u>Title page,</u>
Item [30], Foreign Application Priority Data, should read:
-- [30] Foreign Application Priority Data
     October 6, 2003    (JP).............................2003-347293 --

Signed and Sealed this

Twenty-eighth Day of June, 2005

JON W. DUDAS
*Director of the United States Patent and Trademark Office*